US012603044B2

(12) United States Patent
Ha et al.

(10) Patent No.: US 12,603,044 B2
(45) Date of Patent: Apr. 14, 2026

(54) PIXEL CIRCUIT AND DISPLAY DEVICE INCLUDING THE SAME

(71) Applicant: Samsung Display Co., LTD., Yongin-si (KR)

(72) Inventors: Jinjoo Ha, Yongin-si (KR); Sehyun Lee, Yongin-si (KR); Kwihyun Kim, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 16 days.

(21) Appl. No.: 18/676,614

(22) Filed: May 29, 2024

(65) Prior Publication Data

US 2025/0061853 A1 Feb. 20, 2025

(30) Foreign Application Priority Data

Aug. 14, 2023 (KR) ........................ 10-2023-0106536

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01); *G09G 2320/0233* (2013.01)

(58) Field of Classification Search
CPC ..... G09G 2320/0233; G09G 2320/043; G09G 3/3233; G09G 3/3266; G09G 3/20; G09G 3/3648; G09G 3/3225; G09G 3/3677; G09G 3/32; G09G 2300/0842; G09G 2300/0426; G09G 2300/0861; G09G 2300/0819; G09G 2300/0852; G09G 2310/08; G09G 2310/0286; G09G 2310/0251; G09G 2330/021
See application file for complete search history.

(56) References Cited

U.S. PATENT DOCUMENTS

| | | | | |
|---|---|---|---|---|
| 2017/0288000 A1* | 10/2017 | Li | ...................... | H10K 59/1213 |
| 2018/0005576 A1* | 1/2018 | Yoon | .................... | G09G 3/3233 |
| 2020/0143741 A1* | 5/2020 | Tsuboi | ................. | G09G 3/3233 |
| 2021/0110771 A1* | 4/2021 | Lee | ...................... | G09G 3/3258 |
| 2023/0083076 A1* | 3/2023 | Kim | ..................... | G09G 3/2011<br>345/212 |

FOREIGN PATENT DOCUMENTS

KR 102297000 B1 9/2021

* cited by examiner

*Primary Examiner* — Dong Hui Liang
(74) *Attorney, Agent, or Firm* — CANTOR COLBURN LLP

(57) ABSTRACT

A pixel circuit comprises a light-emitting element, a first transistor which provides a driving current to the light-emitting element, a first capacitor including a first terminal connected to a first terminal of the first transistor and a second terminal connected to a gate terminal of the first transistor, a second capacitor including a first terminal connected to the gate terminal of the first transistor and a second terminal connected to a second terminal of the first transistor, a second transistor which provides a data voltage to the gate terminal of the first transistor in response to a write gate signal, and a third transistor which connects the second terminal of the first transistor and an anode terminal of the light-emitting element in response to a first emission signal.

17 Claims, 13 Drawing Sheets

PIXEL CIRCUIT AND DISPLAY DEVICE INCLUDING THE SAME

This application claims priority to Korean Patent Application No. 10-2023-0106536, filed on Aug. 14, 2023, and all the benefits accruing therefrom under 35 U.S.C. § 119, the content of which in its entirety is herein incorporated by reference.

BACKGROUND

1. Field

Embodiments of the inventive concept relate to a pixel circuit and a display device including the same.

2. Description of the Related Art

Generally, a display device includes a display panel and a display panel driver. The display panel includes gate lines, data lines, and pixel circuits. The display panel driver includes a gate driver for providing gate signals to the gate lines, a data driver for providing data voltages to the data lines, and a driving controller for controlling the gate driver and the data driver.

Recently, a display device for providing a virtual reality ("VR") or augmented reality ("AR") stands out. Therefore, a low area and a high pixels per inch ("PPI") are desired in the display device.

SUMMARY

Since a pitch occupied by a pixel circuit is narrowed for a low area and a high pixels per inch ("PPI"), there may be a restriction on a number of transistors constituting a pixel circuit and signals applied to the pixel circuit. Additionally, as the PPI increases, a data range of a data voltage may decrease. That is, as the PPI increases, a luminance accuracy depending on a change of the data voltage may relatively decrease.

Embodiments of the inventive concept provide a pixel circuit for a relatively low area and a relatively high PPI.

Embodiments of the inventive concept provide a display device including the display circuit.

In an embodiment of a pixel circuit according to the inventive concept, the pixel circuit comprises a light-emitting element, a first transistor which provides a driving current to the light-emitting element, a first capacitor including a first terminal connected to a first terminal of the first transistor and a second terminal connected to a gate terminal of the first transistor, a second capacitor including a first terminal connected to the gate terminal of the first transistor and a second terminal connected to a second terminal of the first transistor, a second transistor which provides a data voltage to the gate terminal of the first transistor in response to a write gate signal, and a third transistor which connects the second terminal of the first transistor and an anode terminal of the light-emitting element in response to a first emission signal.

In an embodiment, the pixel circuit may further comprise a fourth transistor which provides a first power supply voltage to the first terminal of the first transistor in response to a second emission signal.

In an embodiment, the pixel circuit may further comprise a fifth transistor which provides a bias voltage to the anode terminal of the light-emitting element in response to an initialization gate signal.

In an embodiment, in a first period, the second emission signal, the write gate signal, and the initialization gate signal may have an active level, and the first emission signal may have an inactive level.

In an embodiment, in the first period, the second transistor may provide the data voltage to the gate terminal of the first transistor, the first terminal of the first transistor may be initialized to the first power supply voltage, and the second terminal of the first transistor may be initialized with the bias voltage.

In an embodiment, in a second period after the first period, the write gate signal and the initialization gate signal may have the active level, and the first emission signal and the second emission signal may have the inactive level.

In an embodiment, in the second period, when the fourth transistor is turned off, the first capacitor stores a threshold voltage of the first transistor.

In an embodiment, in a third period after the second period, the second emission signal, the write gate signal, and the initialization gate signal may have the active level, and the first emission signal may have the inactive level.

In an embodiment, in the third period, the first capacitor may maintain a threshold voltage of the first transistor.

In an embodiment, in the first to third periods, the third transistor may be turned off so that the second terminal of the first transistor and the anode terminal of the light-emitting element may not be connected to each other.

In an embodiment, in a fourth period after the third period, the first emission signal and the second emission signal may have the active level, and the write gate signal and the initialization gate signal may have the inactive level.

In an embodiment, in the fourth period, a voltage of the gate terminal of the first transistor may be divided by the first capacitor and the second capacitor.

In an embodiment, in the fourth period, the third transistor may be turned on so that the third transistor may connect the second terminal of the first transistor and the anode terminal of the light-emitting element.

In an embodiment, the first transistor may include the gate terminal connected to a first node, the first terminal connected to a second node, and the second terminal connected to a third node, the first capacitor may include the first terminal connected to the second node and the second terminal connected to the first node, the second capacitor may include the first terminal connected to the first node and the second terminal connected to the third node, the second transistor may include a gate terminal receiving the write gate signal, a first terminal connected to a data line, and a second terminal connected to the first node, the third transistor may include a gate terminal receiving the first emission signal, a first terminal connected to the third node, and a second terminal connected to the anode terminal of the light-emitting element, the fourth transistor may include a gate terminal receiving the second emission signal, a first terminal connected to a line of the first power supply voltage, and a second terminal connected to the second node, the fifth transistor may include a gate terminal receiving the initialization gate signal, a first terminal connected to the third node, and a second terminal connected to a line of the bias voltage, and the light-emitting element may include the anode terminal connected to the second terminal of the third transistor and a cathode terminal connected to a line of a second power supply voltage.

In an embodiment, a back gate terminal of the first transistor may be connected to the first terminal of the first transistor.

In an embodiment, back gate terminals of the first to fifth transistors may receive the first power supply voltage.

In an embodiment, the first to fifth transistors may be P-type transistors.

In an embodiment of a display device according to the inventive concept, the display device comprises a display panel including a pixel circuit, a data driver which provides a data voltage to the pixel circuit, a gate driver which provides a write gate signal to the pixel circuit, an emission driver which provides a first emission signal to the pixel circuit, and a driving controller which controls the data driver, the gate driver, and the emission driver. The pixel circuit includes a light-emitting element, a first transistor which provides a driving current to the light-emitting element, a first capacitor including a first terminal connected to a first terminal of the first transistor and a second terminal connected to a gate terminal of the first transistor, a second capacitor including a first terminal connected to the gate terminal of the first transistor and a second terminal connected to a second terminal of the first transistor, a second transistor which provides a data voltage to the gate terminal of the first transistor in response to the write gate signal, and a third transistor which connects the second terminal of the first transistor and an anode terminal of the light-emitting element in response to the first emission signal.

In an embodiment, the emission driver may further provide a second emission signal to the pixel circuit, and the pixel circuit further includes a fourth transistor which provides a first power supply voltage to the first terminal of the first transistor in response to the second emission signal.

In an embodiment, the gate driver may further provide an initialization gate signal to the pixel circuit, and the pixel circuit may further include a fifth transistor which provides a bias voltage to the anode terminal of the light-emitting element in response to the initialization gate signal.

In the embodiments of the display panel and the display device including the pixel circuit, the pixel circuit may include the first capacitor so that the pixel circuit may compensate a threshold voltage of the first transistor. In the first to third periods, the third transistor may be turned off so that a deterioration of the light-emitting element may be prevented, and a luminance accuracy depending on the data voltage may be increased. The pixel circuit may include the second capacitor so that a data range of the data voltage may be expanded through a voltage distribution of the first capacitor and the second capacitor, and the threshold voltage of the first transistor may be additionally compensated. The pixel circuit may connect the back gate terminal of the first transistor with the first terminal of the first transistor, or the first power supply voltage may be provided to the back gate terminal of the first transistor so that a body effect on the first transistor may be minimized, and a threshold voltage compensation ability of the pixel circuit may be improved.

BRIEF DESCRIPTION OF THE DRAWINGS

The above and other features of embodiments of the inventive concept will become more apparent by describing in detailed embodiments thereof with reference to the accompanying drawings, in which.

DETAILED DESCRIPTION

Figure 1:
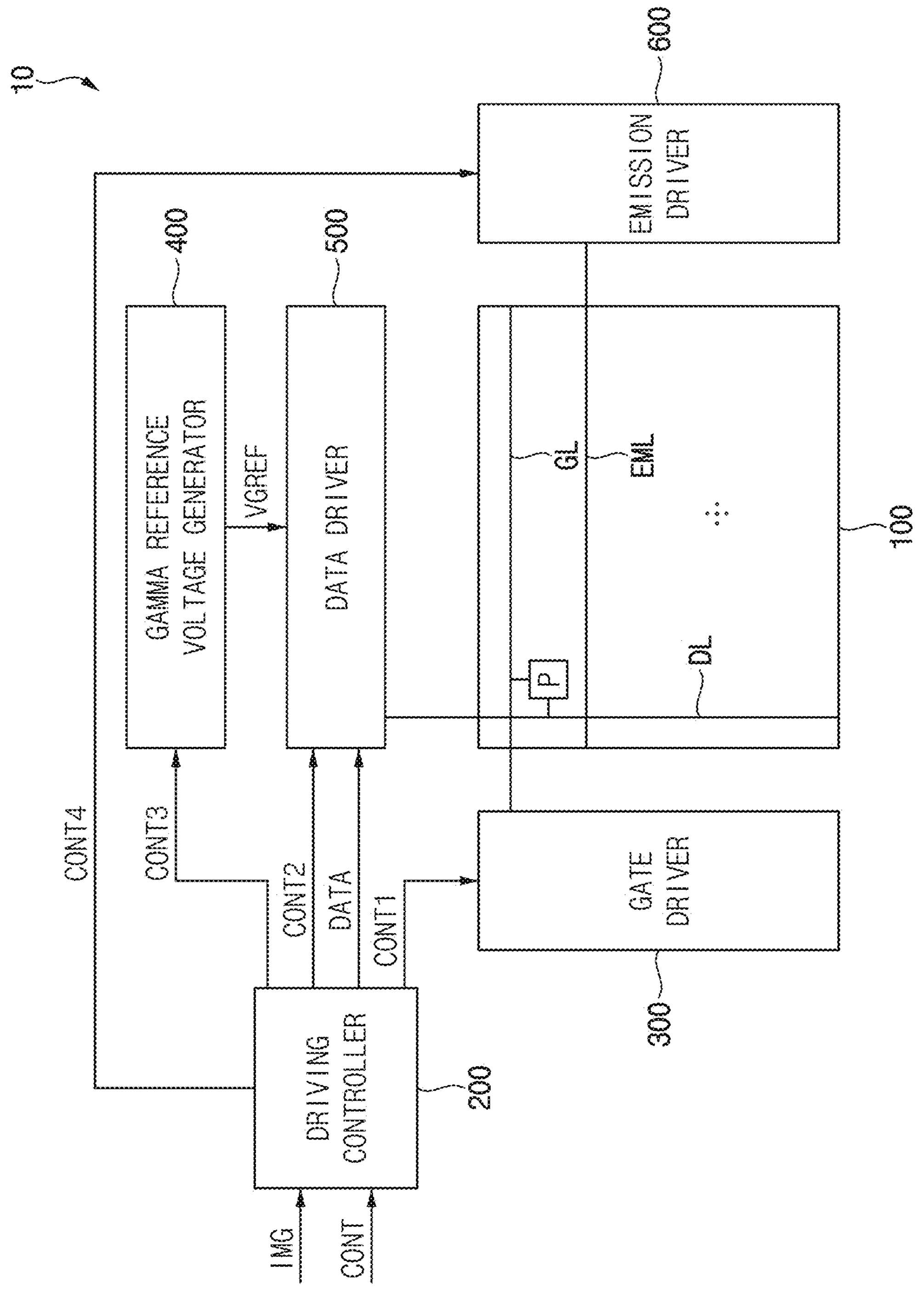
FIG. 1 is a block diagram illustrating an embodiment of a display device according to the inventive concept.

Hereinafter, the disclosure will be described in more detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device according to the inventive concept.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

In an embodiment, the driving controller 200 and the data driver 500 may be unitary with each other, for example. In an embodiment, the driving controller 200, the gamma reference voltage generator 400, and the data driver 500 may be unitary with each other, for example. In an embodiment, the driving controller 200, the gate driver 300, the gamma reference voltage generator 400, and the data driver 500 may be unitary with each other, for example. In an embodiment, the driving controller 200, the gate driver 300, the gamma reference voltage generator 400, the data driver 500, and the emission driver 600 may be unitary with each other, for example. A driving module in which at least the driving controller 200 and the data driver 500 are unitary may be also referred to as a timing controller embedded data driver ("TED").

The display panel 100 may include a display region displaying an image and a peripheral region disposed adjacent to the display region.

In an embodiment, the display panel 100 may be an organic light-emitting diode display panel including an organic light-emitting diode, for example. In another embodiment, the display panel 100 may be a quantum-dot organic light-emitting diode display panel including an organic light-emitting diode and a quantum-dot color filter. In another embodiment, the display panel 100 may be a quantum-dot nano-light-emitting diode display panel including a nano-light-emitting diode and a quantum-dot color filter. In another embodiment, the display panel 100 may be a liquid crystal display panel including a liquid crystal layer.

The display panel 100 may include gate lines GL, data lines DL, emission lines EML, and pixel circuits P electrically connected to the gate lines GL, the data lines DL, and the emission lines EML. The gate lines GL may extend in a first direction, the data lines DL may extend in a second direction crossing the first direction, and the emission lines EML my extend in the first direction.

The driving controller 200 may receive input image data IMG and an input control signal CONT from an external device (not shown). In an embodiment, the input image data IMG may include red image data, green image data, and blue image data, for example. In an embodiment, the input image data IMG may further include white image data. In another embodiment, the input image data IMG may include magenta image data, yellow image data, and cyan image data. However, the disclosure is not limited thereto, and the input image data IMG may include various other color data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT and output the third control signal CONT3 to the gamma reference voltage generator 400.

The driving controller 200 may generate the fourth control signal CONT4 for controlling an operation of the emission driver 600 based on the input control signal CONT and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog type data voltage by the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated into the peripheral region of the display panel 100. In an embodiment, the emission driver 600 may be disposed (e.g., mounted) on the peripheral region of the display panel 100.

In FIG. 1, for a convenience of a description, the gate driver 300 may be disposed on a first side (e.g., left side in FIG. 1) of the display panel 100 and the emission driver 600 may be disposed on a second side (e.g., right side in FIG. 1) of the display panel 100. However, the disclosure is not limited thereto. In an embodiment, both the gate driver 300 and the emission driver 600 may be disposed on the first side of the display panel 100, for example. In an embodiment, both the gate driver 300 and the emission driver 600 may be disposed on each of opposite sides of the display panel 100, for example. In an embodiment, the gate driver 300 and the emission driver 600 may be unitary with each other, for example.

Figure 2:
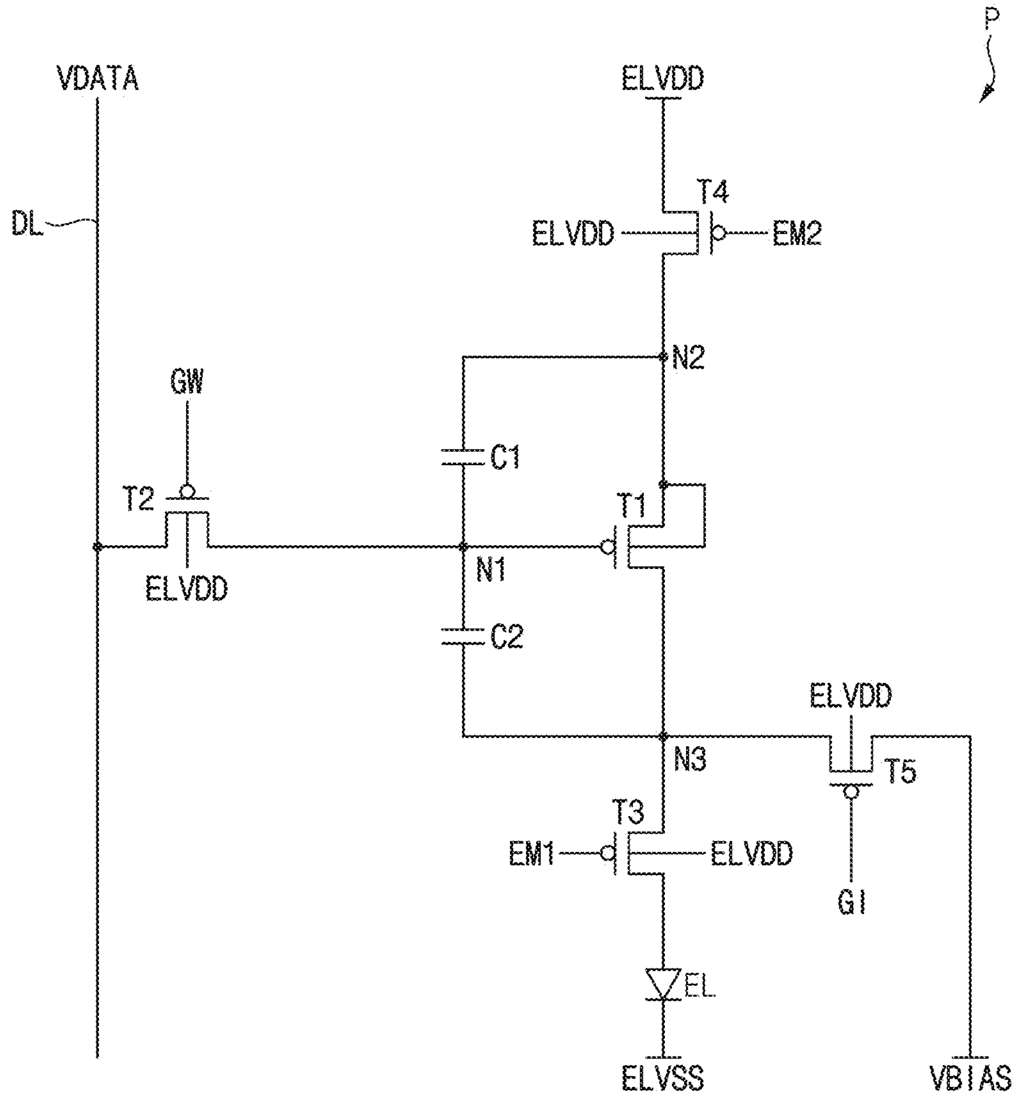
FIG. 2 is a circuit diagram illustrating an embodiment of a pixel circuit of FIG. 1.
Figure 3:
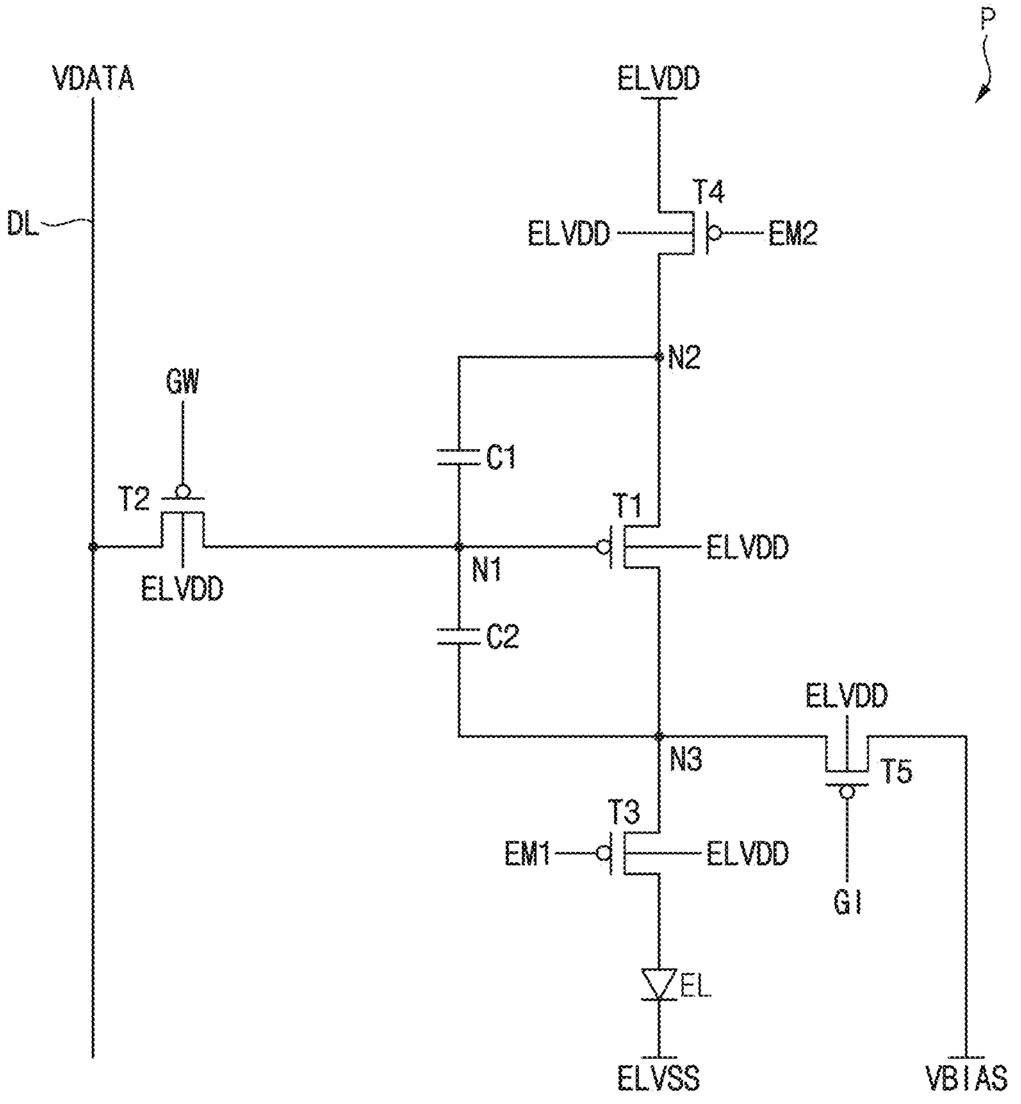
FIG. 3 is a circuit diagram illustrating an embodiment of a pixel circuit of FIG. 1.

FIG. 2 is a circuit diagram illustrating an embodiment of a pixel circuit of FIG. 1. FIG. 3 is a circuit diagram illustrating an embodiment of a pixel circuit of FIG. 1.

Referring to FIGS. 1 to 3, a pixel circuit P may include a light-emitting element EL, a first transistor T1, a first capacitor C1, a second capacitor C2, a second transistor T2, and a third transistor T3.

The first transistor T1 may provide a driving current to the light-emitting element EL. The first capacitor C1 may include a first terminal connected to a first terminal of the first transistor T1 and a second terminal connected to a gate terminal of the first transistor T1. The second capacitor C2 may include a first terminal connected to the gate terminal of the first transistor T1 and a second terminal connected to a second terminal of the first transistor T1. The second transistor T2 may provide a data voltage VDATA to the gate terminal of the first transistor T1 in response to a write gate signal GW. The third transistor T3 may connect the second terminal of the first transistor T1 and an anode terminal of the light-emitting element EL in response to a first emission signal EM1. In an embodiment, the pixel circuit P may further include a fourth transistor T4 providing a first power supply voltage ELVDD to the first terminal of the first transistor T1 in response to a second emission signal EM2. In an embodiment, the pixel circuit P may further include a fifth transistor T5 providing a bias voltage VBIAS to the anode terminal of the light-emitting element EL in response to an initialization gate signal GI.

In an embodiment, the first transistor T1 may include the gate terminal connected to a first node N1, the first terminal connected to a second node N2, and the second terminal connected to a third node N3, for example. The first capacitor C1 may include the first terminal connected to the second node N2 and the second terminal connected to the first node N1. The second capacitor C2 may include the first terminal connected to the first node N1 and the second terminal connected to the third node N3. The second transistor T2 may include a gate terminal receiving the write gate signal GW, a first terminal connected to a data line DL, and a second terminal connected to the first node N1. The third transistor T3 may include a gate terminal receiving the first emission signal EM1, a first terminal connected to the third node N3, and a second terminal connected to the anode terminal of the light-emitting element EL. The fourth transistor T4 may include a gate terminal receiving the second emission signal EM2, a first terminal connected to a line of the first power supply voltage ELVDD, and a second terminal connected to the second node N2. The fifth transistor T5 may include a gate terminal receiving the initialization gate signal GI, a first terminal connected to the third node N3, and a second terminal connected to a line of the bias voltage VBIAS. The light-emitting element EL may include the anode terminal connected to the second terminal of the third transistor T3 and a cathode terminal connected to a line of the second power supply voltage ELVSS.

In an embodiment, the first terminals of the first to fifth transistors T1 to T5 may be source terminals, and the second terminals of the first to fifth transistors T1 to T5 may be drain terminals. However, the disclosure is not limited thereto, and the first terminals of the first to fifth transistors T1 to T5 may be drain terminals, and the second terminals of the first to fifth transistors T1 to T5 may be source terminals based on types of the fifth transistors T1 to T5.

When a reverse bias is formed at the first terminal (i.e., the source terminal) of the first transistor T1 and the back gate terminal of the first transistor T1, a body effect in which the threshold voltage of the first transistor T1 changes may occur. As the body effect on the first transistor T1 is minimized, a threshold voltage compensation ability of the pixel circuit P may be improved.

As shown in FIG. 2, in an embodiment, a back gate terminal of the first transistor T1 may be connected to the first terminal of the first transistor T1. Accordingly, since a voltage difference between the back gate terminal and the first terminal of the first transistor T1 becomes 0, the body effect on the first transistor T1 may be minimized.

As shown in FIG. 3, in an embodiment, the back gate terminal of the first transistor T1 may receive the first power supply voltage ELVDD. When the second emission signal EM2 has the active level, a voltage of the back gate terminal of the first transistor T1 and a voltage of the first terminal of the first transistor T1 may become equal to the first power supply voltage ELVDD. Accordingly, the body effect may be minimized.

In an embodiment, back gate terminals of the second to fifth transistors T2 to T5 may receive the first power supply voltage ELVDD.

In an embodiment, the first to fifth transistors T1 to T5 may be P-type transistors. In an embodiment, the first to fifth transistors T1 to T5 may be low temperature polysilicon ("LTPS") thin film transistors, for example. In this case, a relatively low voltage level may be the active level, and a relatively high voltage level may be an inactive level. In an embodiment, when a signal applied to a gate terminal of the P-type transistor has the relatively low voltage level, the P-type transistor may be turned on, for example. In an embodiment, when the signal applied to the gate terminal of the P-type transistor has the relatively high voltage level, the P-type transistor may be turned off, for example.

However, the inventive concept is not limited to this. In an embodiment, the first to fifth transistors T1 to T5 may be N-type transistors. In an embodiment, the first to fifth transistors T1 to T5 may be oxide thin film transistors, for example. In this case, the relatively high voltage level may be the active level, and the relatively low voltage level may be the inactive level. In an embodiment, when a signal applied to a gate terminal of the N-type transistor has the relatively high voltage level, the N-type transistor may be turned on, for example. In an embodiment, when the signal applied to the gate terminal of the N-type transistor has the relatively low voltage level, the N-type transistor may be turned off, for example.

Figure 4:
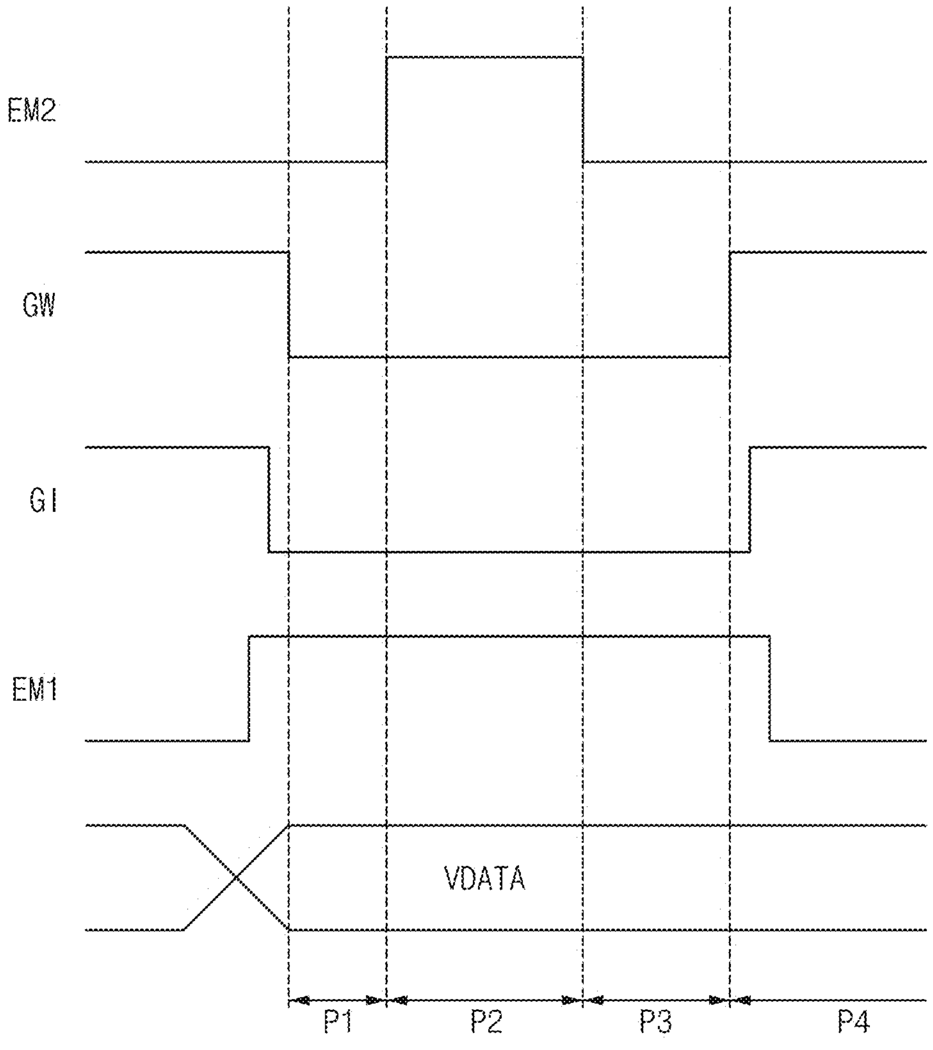
FIG. 4 is a timing diagram illustrating an embodiment of driving a pixel circuit of FIG. 2.

FIG. 4 is a timing diagram illustrating an embodiment of driving a pixel circuit of FIG. 2.

Referring to FIGS. 1 to 4, in a first period P1, the second emission signal EM2, the write gate signal GW, and the initialization gate signal GI may have the active level, and the first emission signal EM1 may have the inactive level.

In a second period P2 after the first period P1, the write gate signal GW and the initialization gate signal GI may have the active level, and the second emission signal EM2 and the first emission signal EM1 may have the inactive level.

In a third period P3 after the second period P2, the second emission signal EM2, the write gate signal GW, and the initialization gate signal GI may have the active level, and the first emission signal EM1 may have the inactive level.

In a fourth period P4 after the third period P3, the second emission signal EM2 and the first emission signal EM1 may have the active level, and the write gate signal GW and the initialization gate signal GI may have the inactive level.

Figure 5:
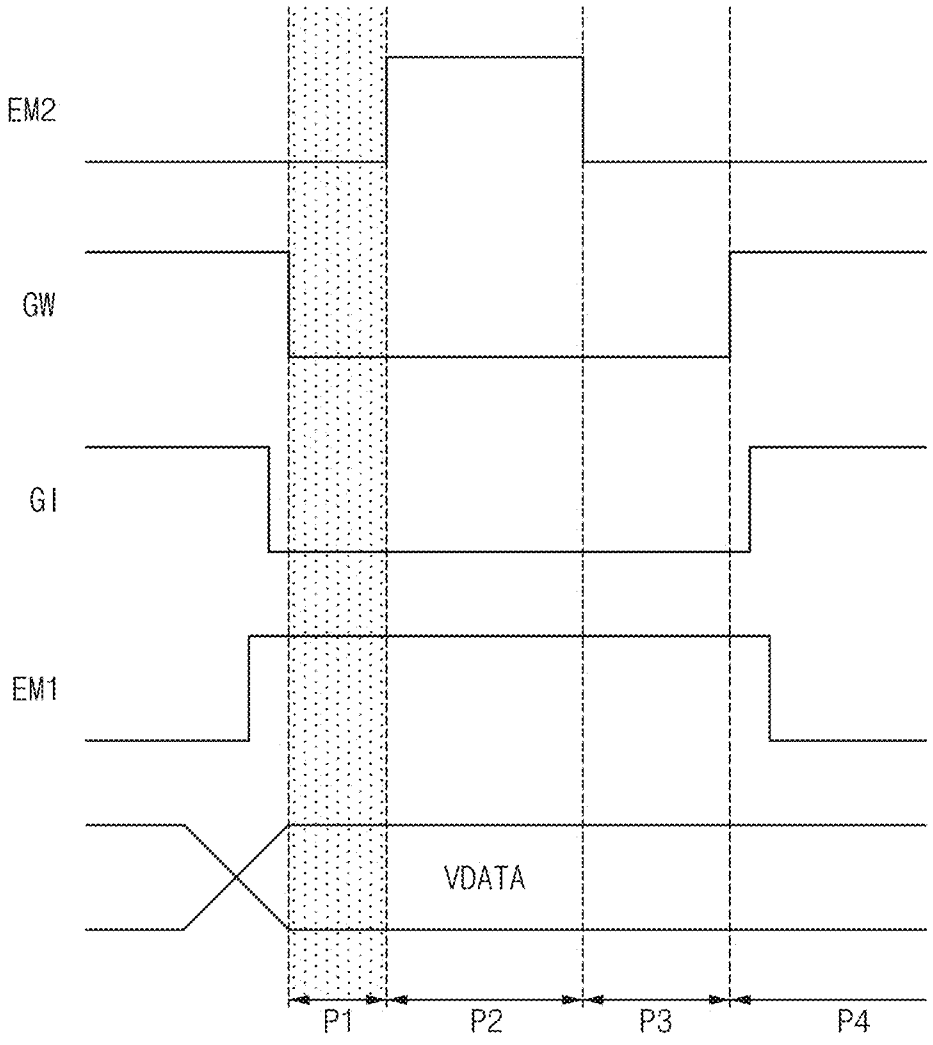
FIG. 5 is a timing diagram illustrating an embodiment in which a pixel circuit of FIG. 2 operates in a first period.
Figure 6:
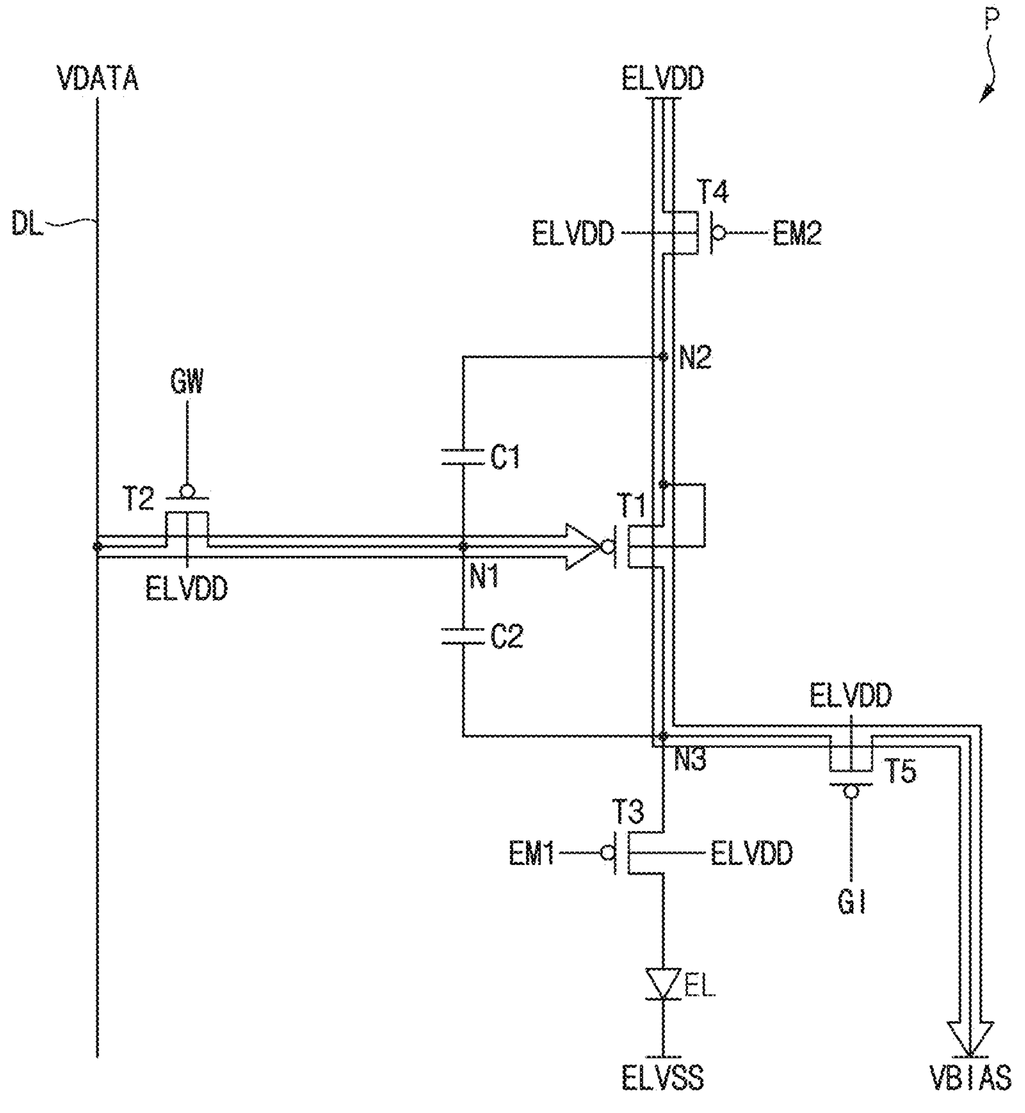
FIG. 6 is a circuit diagram illustrating an embodiment in which a pixel circuit of FIG. 2 operates in a first period.

FIG. 5 is a timing diagram illustrating an embodiment in which a pixel circuit of FIG. 2 operates in a first period. FIG. 6 is a circuit diagram illustrating an embodiment in which a pixel circuit of FIG. 2 operates in a first period.

Referring to FIGS. 1 to 6, in the first period P1, the first transistor T1, the second transistor T2, the fourth transistor T4, and the fifth transistor T5 may be turned on, and the third transistor T3 may be turned off.

The second transistor T2 may provide the data voltage VDATA to the first node N1 (i.e., the gate terminal of the first transistor).

A path may be formed through the fourth transistor T4, the first transistor T1, and the fifth transistor T5. The first terminal of the first transistor T1 may be initialized through the path. The anode terminal of the light-emitting element EL may be initialized through the path. In an embodiment, the second node N2 (i.e., the first terminal of the first transistor T1) may be initialized to the first power supply voltage ELVDD, for example. In an embodiment, the third node N3 (i.e., the second terminal of the first transistor T1) may be initialized to the bias voltage VBIAS, for example.

Since the anode terminal of the light-emitting element EL is initialized to the bias voltage VBIAS, a light emission of the light-emitting element EL due to leakage current in the pixel circuit P displaying a black may be minimized.

Figure 7:
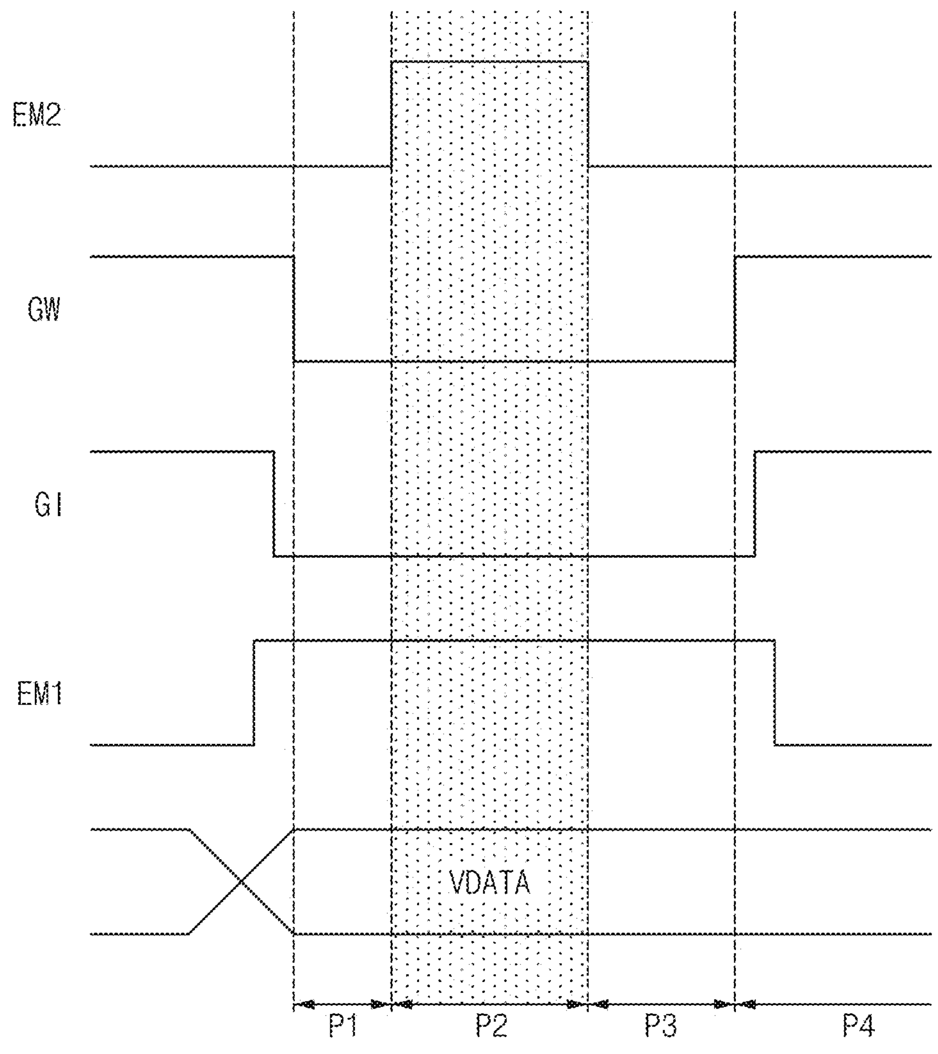
FIG. 7 is a timing diagram illustrating an embodiment in which a pixel circuit of FIG. 2 operates in a second period.
Figure 8:
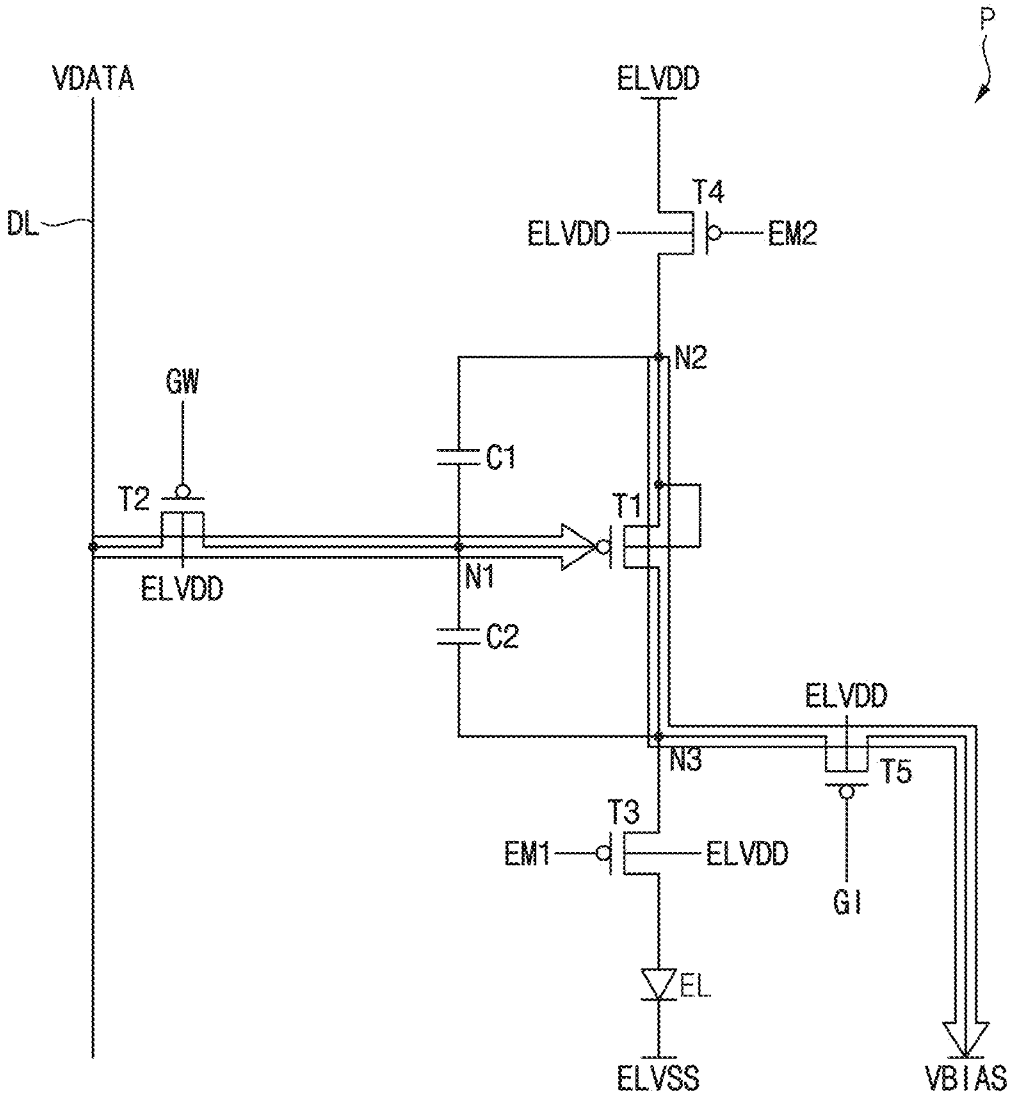
FIG. 8 is a circuit diagram illustrating an embodiment in which a pixel circuit of FIG. 2 operates in a second period.

FIG. 7 is a timing diagram illustrating an embodiment in which a pixel circuit of FIG. 2 operates in a second period. FIG. 8 is a circuit diagram illustrating an embodiment in which a pixel circuit of FIG. 2 operates in a second period.

Referring to FIGS. 1 to 8, in the second period P2, the second transistor T2 and the fifth transistor T5 may be turned on, and the third transistor T3 and the fourth transistor T4 may be turned off.

Since the second transistor T2 provides the data voltage VDATA to the first node N1 and the fourth transistor T4 is turned off, a voltage of the first node N1 may be the data voltage VDATA and a voltage of the second node N2 may be VDATA+VTH. Here, VDATA denotes the data voltage, and VTH denotes the threshold voltage of the first transistor T1. The first capacitor C1 may store the threshold voltage of the first transistor T1. Accordingly, the threshold voltage of the first transistor T1 may be compensated.

Figure 9:
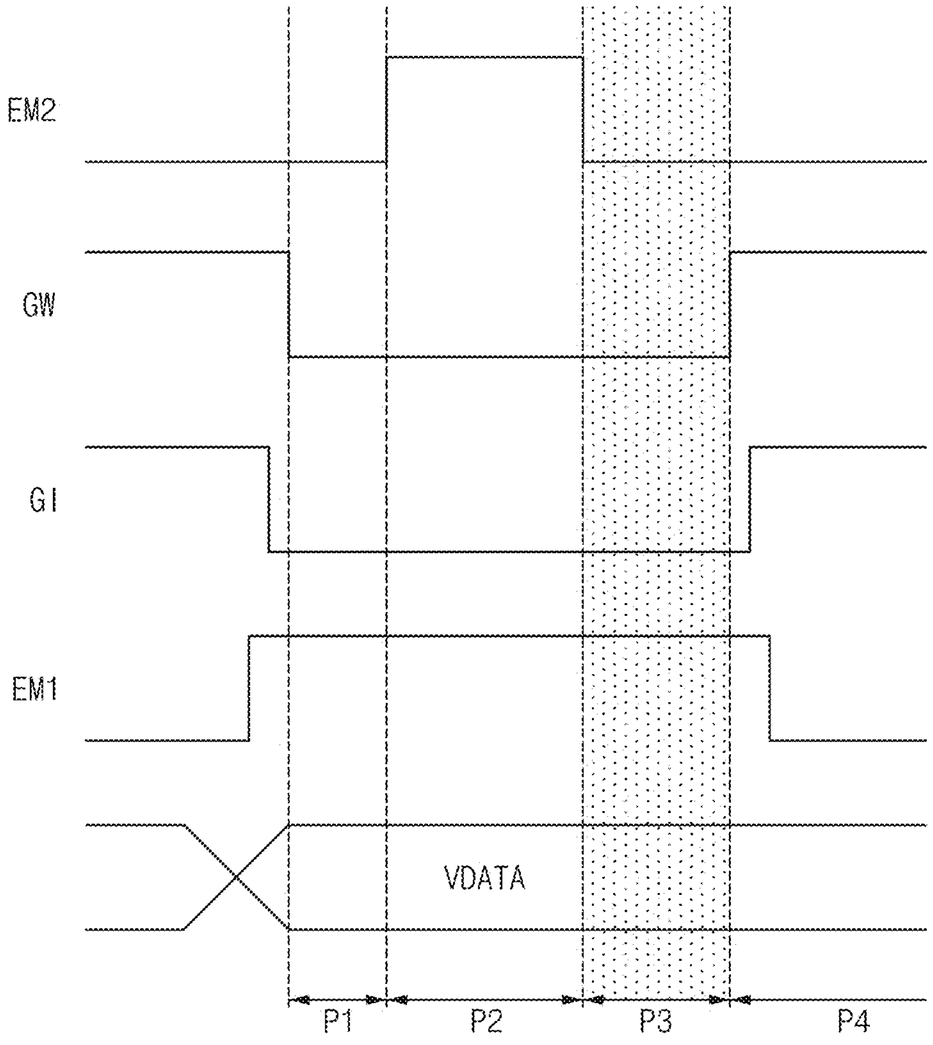
FIG. 9 is a timing diagram illustrating an embodiment in which a pixel circuit of FIG. 2 operates in a third period.
Figure 10:
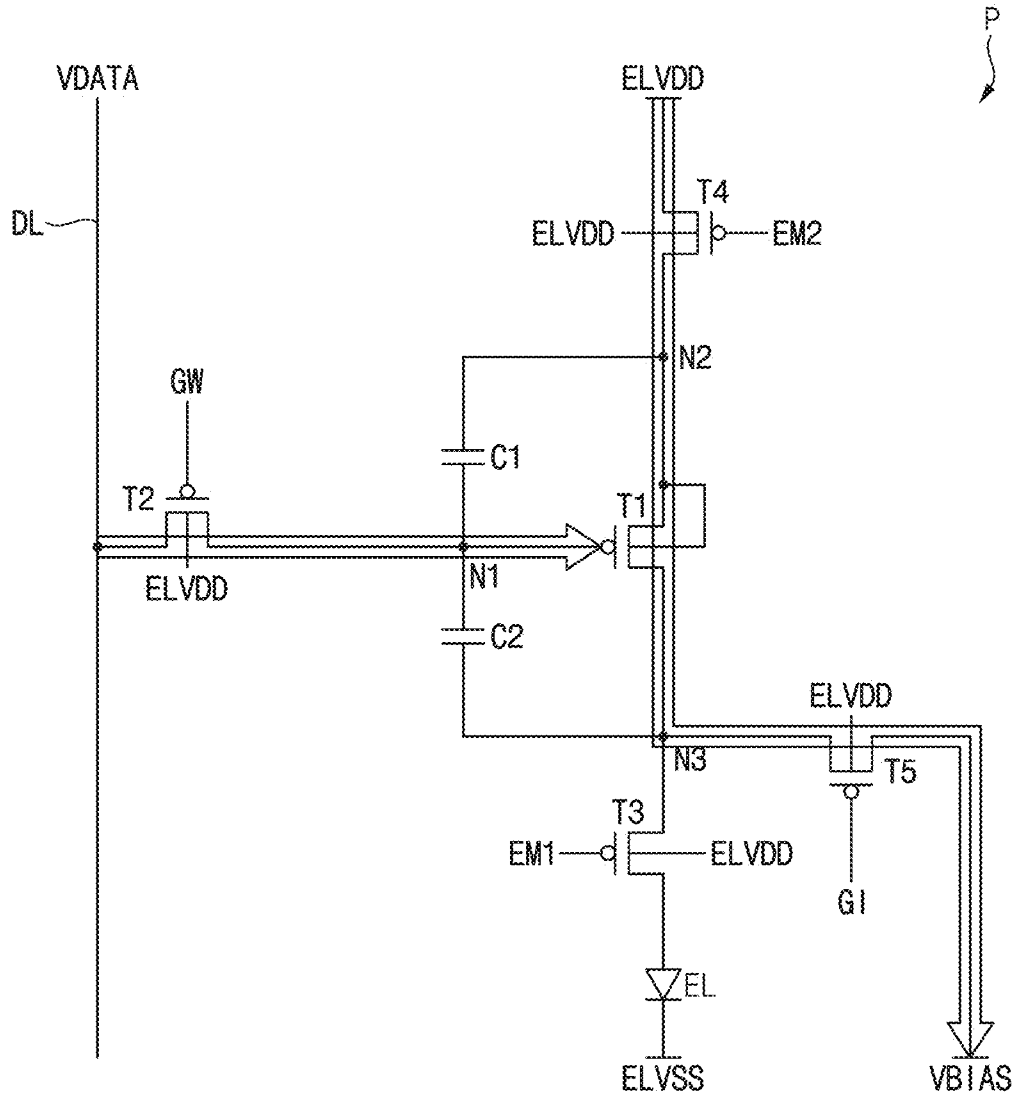
FIG. 10 is a circuit diagram illustrating an embodiment in which a pixel circuit of FIG. 2 operates in a third period.

FIG. 9 is a timing diagram illustrating an embodiment in which a pixel circuit of FIG. 2 operates in a third period. FIG. 10 is a circuit diagram illustrating an embodiment in which a pixel circuit of FIG. 2 operates in a third period.

Referring to FIGS. 1 to 10, in the third period P3, the first transistor T1, the second transistor T2, the fourth transistor T4, and the fifth transistor T5 may be turned on, and the third transistor T3 may be turned off.

In the third period P3, the first capacitor C1 may maintain the threshold voltage of the first transistor T1 stored in the second period P2. Accordingly, the threshold voltage of the first transistor T1 may be continuously compensated.

A voltage of the first node N1 may be determined based on the data voltage VDATA, the driving current of the first transistor T1 may be determined based on the voltage of the first node N1, and the light-emitting element EL may emit a light with a luminance corresponding to the driving current of the first transistor T1.

Figure 11:
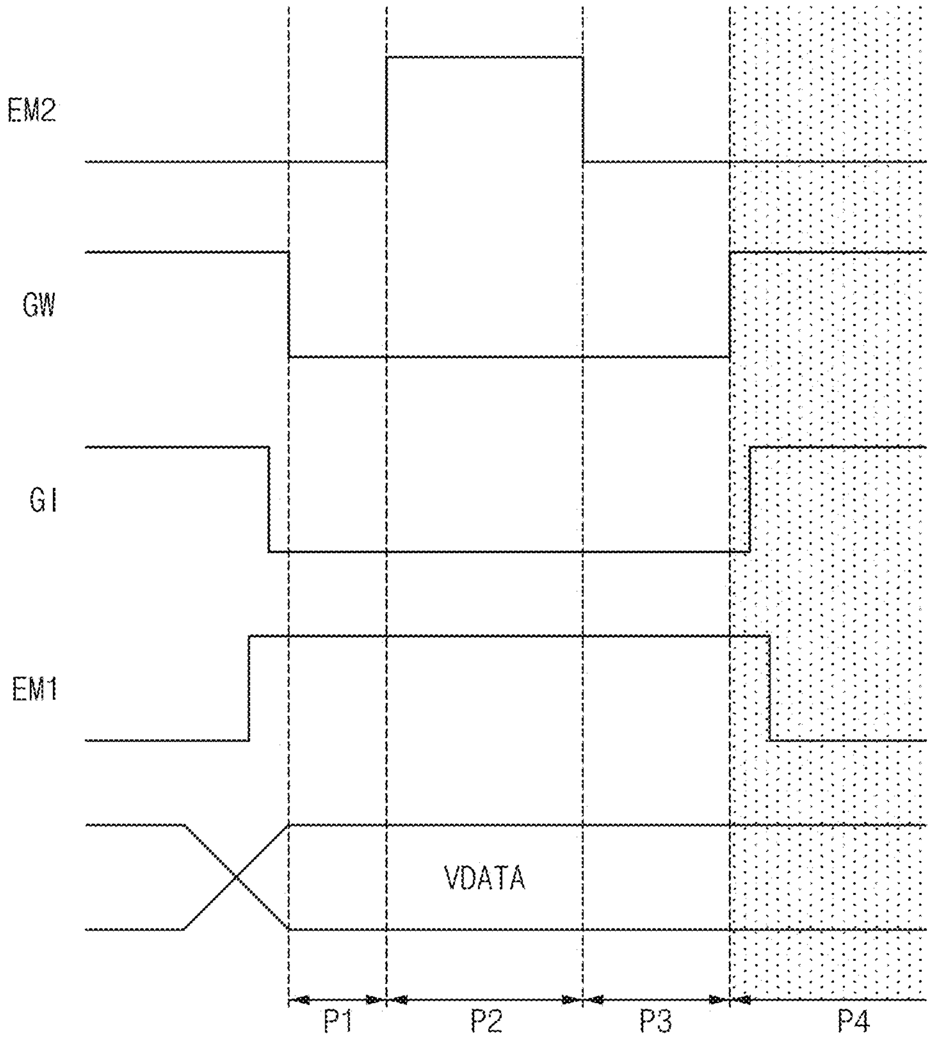
FIG. 11 is a timing diagram illustrating an embodiment in which a pixel circuit of FIG. 2 operates in a fourth period.
Figure 12:
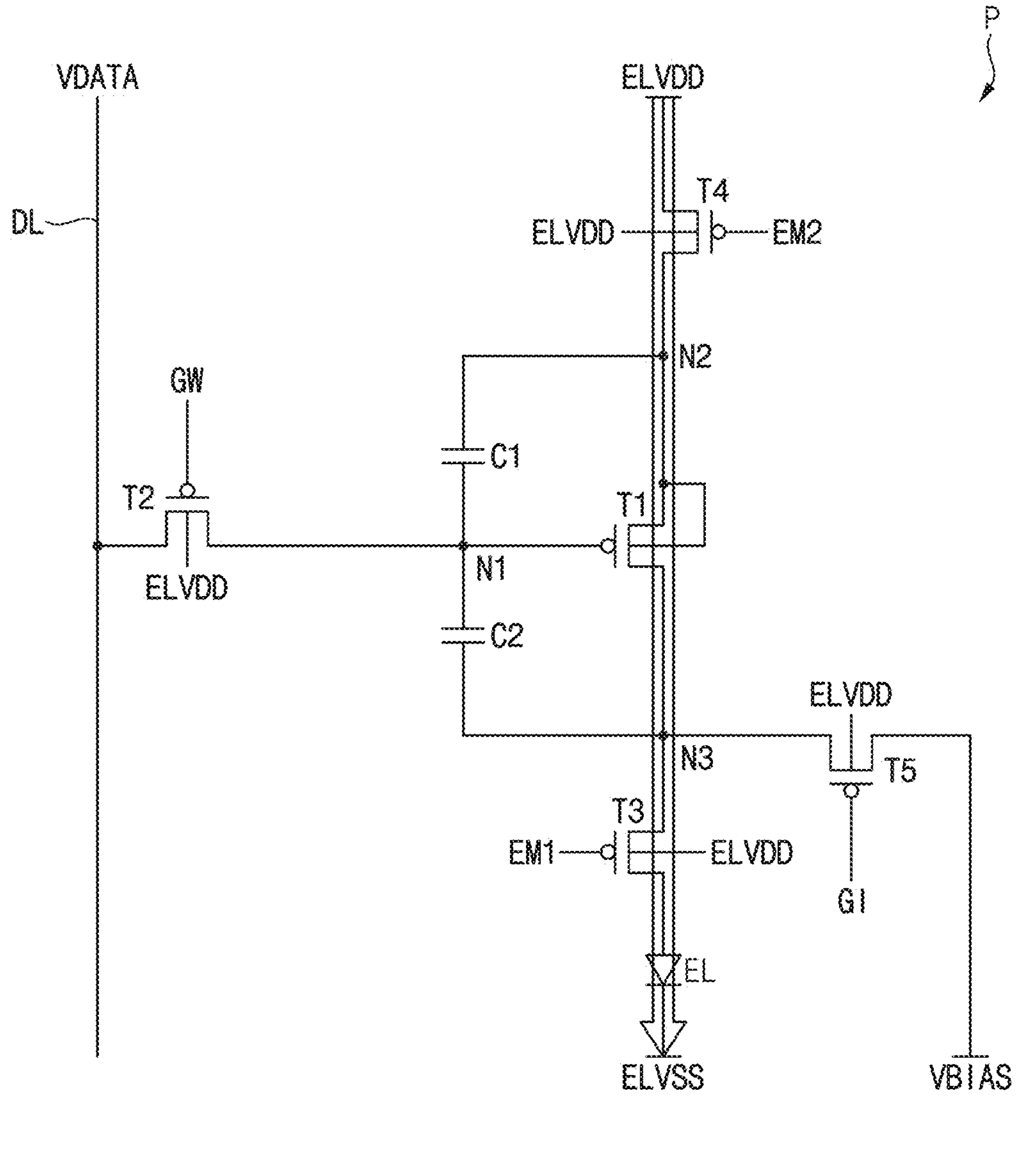
FIG. 12 is a circuit diagram illustrating an embodiment in which a pixel circuit of FIG. 2 operates in a fourth period.

FIG. 11 is a timing diagram illustrating an embodiment in which a pixel circuit of FIG. 2 operates in a fourth period. FIG. 12 is a circuit diagram illustrating an embodiment in which a pixel circuit of FIG. 2 operates in a fourth period.

Referring to FIGS. 1 to 12, in the fourth period P4, the third transistor T3 and the fourth transistor T4 may be turned on, and the second transistor T2 and the fifth transistor T5 may be turned off.

Since the voltage of the second node N2 is the first power supply voltage ELVDD and the fifth transistor T5 is turned off, the voltage of the first node N1 (i.e., the voltage of the gate terminal of the first transistor T1) may be divided by the first capacitor C1 and the second capacitor C2. Therefore, the voltage of the first node N1 may be VDATA+(ELVDD−(VDATA+VTH)×(C_C1)/(C_C1+C_C2)). Since a VDATA component of the voltage of the first node N1 is VDATA×(C_C1)/(C_C1+C_C2), and (C_C1)/(C_C1+C_C2) is less than 1, a data range of the data voltage VDATA may be expanded. Here, ELVDD denotes the first power supply voltage, VDATA denotes the data voltage, VTH denotes the threshold voltage of the first transistor T1, C_C1 denotes a capacitance of the first capacitor C1, and C_C2 denotes a capacitance of the second capacitor C2.

When the light-emitting element EL deteriorates, a voltage of the anode terminal may change. When the voltage of the anode terminal changes, the voltage of the first node N1 may change. When the voltage of the first node N1 changes, the driving current of the first transistor T1 may change. Accordingly, a luminance accuracy depending on the data voltage VDATA may be reduced.

In the first to third periods P1 to P3, the third transistor T3 may be turned off such that the second terminal of the first transistor T1 and the anode terminal of the light-emitting element EL may not be connected to each other. That is, the anode terminal of the light-emitting element EL may be in a floating state, and the deterioration of the light-emitting element EL may be prevented. Accordingly, the luminance accuracy depending on the data voltage VDATA may increase.

Additionally, the pixel circuits P may include the first transistors T1, respectively, and a threshold voltage of each of the first transistors T1 may be different depending on a characteristic of each of the first transistors T1. Therefore, although a same data voltage VDATA is applied to each of the pixel circuits P, a luminance depending on the data voltage VDATA may be different for each of the pixel circuits P.

As the light-emitting element EL emits the light in the fourth period P4, a voltage of the third node N3 may change. A degree to which the voltage of the third node N3 changes may vary depending on the threshold voltage of each of the first transistors T1.

When the voltage of the third node N3 changes, the voltage of the first node N1 may be $VN1+(VN3'-VN3)\times C\_C2/(C\_C1+C\_C2)$ due to a voltage distribution of the first capacitor C1 and the second capacitor C2. That is, the voltage of the first node N1 may be $VDATA+(ELVDD-(VDATA+VTH)\times(C\_C1)/(C\_C1+C\_C2))+VN1+(VN3'-VN3)\times C\_C2/(C\_C1+C\_C2)$. A component related to VTH of the voltage of the first node N1 may be $-VTH\times(C\_C1)/(C\_C1+C\_C2)+(VN3'-VN3)\times C\_C2/(C\_C1+C\_C2)$. Therefore, although the threshold voltage of each of the first transistors T1 is different depending on the characteristics of each of the first transistors T1, $-VTH\times(C\_C1)/(C\_C1+C\_C2)$ and $(VN3'-VN3)\times C\_C2/(C\_C1+C\_C2)$ may cancel each other out. Accordingly, the pixel circuit P may include the second capacitor C2 such that the threshold voltage of the first transistor T1 may be additionally compensated. Here, VN1 denotes the voltage of the first node N1, VN3 denotes the voltage of the third node N3 before a change, and VN3' denotes the voltage of the third node N3 after the change.

As such, the pixel circuit P may include the first capacitor C1 such that the pixel circuit P may compensate the threshold voltage of the first transistor T1. In the first to third periods P1 to P3, the third transistor T3 may be turned off such that the deterioration of the light-emitting element EL may be prevented, and the luminance accuracy depending on the data voltage VDATA may be increased. The pixel circuit P may include the second capacitor C2 such that the data range of the data voltage VDATA may be expanded through the voltage distribution of the first capacitor C1 and the second capacitor C2, and the threshold voltage of the first transistor T1 may be additionally compensated. The pixel circuit P may connect the back gate terminal of the first transistor T1 with the first terminal of the first transistor, or the first power supply voltage ELVDD may be provided to the back gate terminal of the first transistor T1 such that the body effect on the first transistor T1 may be minimized, and the threshold voltage compensation ability of the pixel circuit P may be improved.

Figure 13:
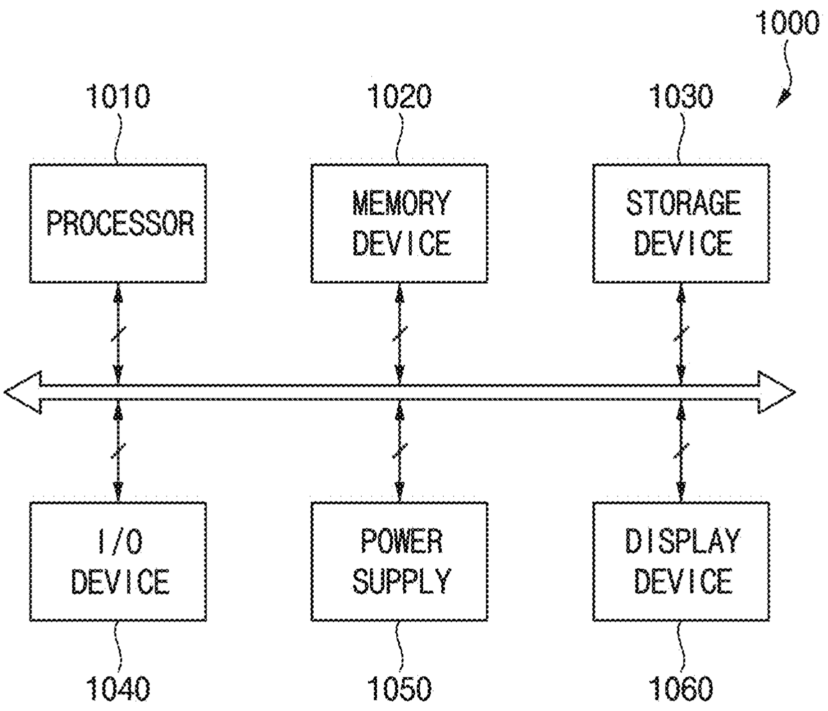
FIG. 13 is a block diagram illustrating an electronic device.
Figure 14:
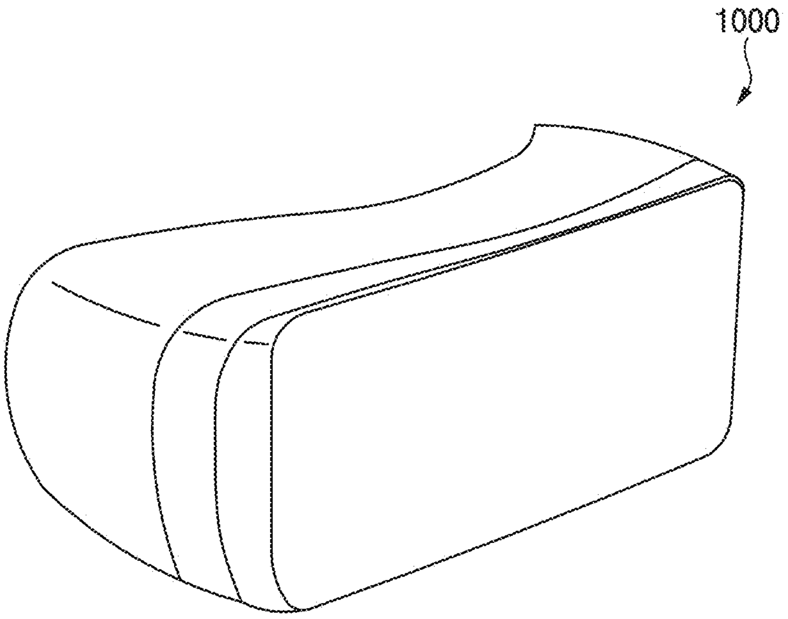
FIG. 14 is a diagram illustrating an embodiment in which the electronic device of FIG. 13 is implemented as a virtual reality ("VR") device.

FIG. 13 is a block diagram illustrating an electronic device. FIG. 14 is a diagram illustrating an embodiment in which the electronic device of FIG. 13 is implemented as a virtual reality ("VR") device.

Referring to FIGS. 13 to 15, an electronic device 1000 may include a processor 1010, a memory device 1020, a storage device 1030, an input/output ("I/O") device 1040, a power supply 1050, and a display device 1060. The display device 1060 may be a display device 10 in FIG. 1. In addition, the electronic device 1000 may further include a plurality of ports for communicating with a video card, a sound card, a memory card, a universal serial bus ("USB") device, other electronic device, or the like.

In an embodiment, as shown in FIG. 14, the electronic device 1000 may be implemented as a VR device. However, the electronic device 1000 is not limited thereto. In an embodiment, the electronic device 1000 may be implemented as a cellular phone, a video phone, a smart pad, a smart watch, a tablet PC, a car navigation system, a computer monitor, a laptop, a head disposed (e.g., mounted) display ("HMD") device, or the like, for example.

The processor 1010 may perform various computing functions. The processor 1010 may be a micro processor, a central processing unit ("CPU"), an application processor ("AP"), or the like. The processor 1010 may be coupled to other components via an address bus, a control bus, a data bus, or the like. Further, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like and/or at least one volatile memory device such as a dynamic random access memory ("DRAM") device, a static random access memory ("SRAM") device, a mobile DRAM device, or the like, for example.

The storage device 1030 may include a solid state drive ("SSD") device, a hard disk drive ("HDD") device, a compact disc read-only memory ("CD-ROM") device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. In an embodiment, the inventive concepts may be applied to a mobile phone, a smart phone, a tablet computer, a digital television ("TV"), a three dimensional ("3D") TV, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:
a light-emitting element including an anode terminal;
a first transistor which provides a driving current to the light-emitting element, the first transistor including a gate terminal, a first terminal and a second terminal;
a first capacitor including a first terminal connected to the first terminal of the first transistor and a second terminal connected to the gate terminal of the first transistor;
a second capacitor including a first terminal connected to the gate terminal of the first transistor and a second terminal connected to the second terminal of the first transistor;
a second transistor which provides a data voltage to the gate terminal of the first transistor in response to a write gate signal;
a third transistor which connects the second terminal of the first transistor and the anode terminal of the light-emitting element in response to a first emission signal;
a fourth transistor which provides a first power supply voltage to the first terminal of the first transistor in response to a second emission signal; and
a fifth transistor provides a bias voltage to the anode terminal of the light-emitting element in response to an initialization gate signal,
wherein the gate terminal of the first transistor is connected to a first node, the first terminal of the first transistor is connected to a second node, and the second terminal of the first transistor is connected to a third node,
the first terminal of the first capacitor is connected to the second node and the second terminal of the first capacitor is connected to the first node,
the first terminal of the second capacitor is connected to the first node and the second terminal of the second capacitor is connected to the third node,
the second transistor includes a gate terminal which receives the write gate signal, a first terminal connected to a data line, and a second terminal connected to the first node,
the third transistor includes a gate terminal which receives the first emission signal, a first terminal connected to the third node, and a second terminal connected to the anode terminal of the light-emitting element,
the fourth transistor includes a gate terminal which receives the second emission signal, a first terminal connected to a line of the first power supply voltage, and a second terminal connected to the second node,
the fifth transistor includes a gate terminal which receives the initialization gate signal, a first terminal connected to the third node, and a second terminal connected to a line of the bias voltage, and
the anode terminal of the light-emitting element is connected to the second terminal of the third transistor, and the light-emitting element further includes a cathode terminal connected to a line of a second power supply voltage.

2. The pixel circuit of claim 1, wherein, in a first period, the second emission signal, the write gate signal, and the initialization gate signal have an active level, and the first emission signal has an inactive level.

3. The pixel circuit of claim 2, wherein, in a second period after the first period, the write gate signal and the initialization gate signal have the active level, and the first emission signal and the second emission signal have the inactive level.

4. The pixel circuit of claim 3, wherein, in a third period after the second period, the second emission signal, the write gate signal, and the initialization gate signal have the active level, and the first emission signal has the inactive level.

5. The pixel circuit of claim 4, wherein, in a fourth period after the third period, the first emission signal and the second emission signal have the active level, and the write gate signal and the initialization gate signal have the inactive level.

6. The pixel circuit of claim 5, wherein, in the fourth period, a voltage of the gate terminal of the first transistor is divided by the first capacitor and the second capacitor.

7. The pixel circuit of claim 5, wherein, in the fourth period, the third transistor is turned on so that the third transistor connects the second terminal of the first transistor and the anode terminal of the light-emitting element.

8. The pixel circuit of claim 4, wherein, in the third period, the first capacitor maintains a threshold voltage of the first transistor.

9. The pixel circuit of claim 4, wherein, in the first to third periods, the third transistor is turned off so that the second terminal of the first transistor and the anode terminal of the light-emitting element are not connected to each other.

10. The pixel circuit of claim 3, wherein, in the second period, when the fourth transistor is turned off, the first capacitor stores a threshold voltage of the first transistor.

11. The pixel circuit of claim 2, wherein, in the first period, the second transistor provides the data voltage to the gate terminal of the first transistor, the first terminal of the first transistor is initialized to the first power supply voltage, and the second terminal of the first transistor is initialized with the bias voltage.

12. The pixel circuit of claim 1, wherein a back gate terminal of the first transistor is connected to the first terminal of the first transistor.

13. The pixel circuit of claim 1, wherein back gate terminals of the first to fifth transistors receive the first power supply voltage.

14. The pixel circuit of claim 1, wherein the first to fifth transistors are P-type transistors.

15. An electronic device comprising:
a display device comprising:
a display panel including a pixel circuit, the pixel circuit including:
a light-emitting element including an anode terminal;
a first transistor which provides a driving current to the light-emitting element, the first transistor including a gate terminal, a first terminal and a second terminal;
a first capacitor including a first terminal connected to the first terminal of the first transistor and a second terminal connected to the gate terminal of the first transistor;
a second capacitor including a first terminal connected to the gate terminal of the first transistor and a second terminal connected to the second terminal of the first transistor;
a second transistor which provides a data voltage to the gate terminal of the first transistor in response to a write gate signal;

a third transistor which connects the second terminal of the first transistor and the anode terminal of the light-emitting element in response to a first emission signal;

a fourth transistor which provides a first power supply voltage to the first terminal of the first transistor in response to a second emission signal; and a fifth transistor provides a bias voltage to the anode terminal of the light-emitting element in response to an initialization gate signal a data driver which provides the data voltage to the pixel circuit;

a gate driver which provides the write gate signal to the pixel circuit;

an emission driver which provides the first emission signal to the pixel circuit; and a driving controller which controls the data driver, the gate driver, and the emission driver, wherein the gate terminal of the first transistor is connected to a first node, the first terminal of the first transistor is connected to a second node, and the second terminal of the first transistor is connected to a third node, the first terminal of the first capacitor is connected to the second node and the second terminal of the first capacitor is connected to the first node, the first terminal of the second capacitor is connected to the first node and the second terminal of the second capacitor is connected to the third node, the second transistor includes a gate terminal which receives the write gate signal, a first terminal connected to a data line, and a second terminal connected to the first node, the third transistor includes a gate terminal which receives the first emission signal, a first terminal connected to the third node, and a second terminal connected to the anode terminal of the light-emitting element, the fourth transistor includes a gate terminal which receives the second emission signal, a first terminal connected to a line of the first power supply voltage, and a second terminal connected to the second node, the fifth transistor includes a gate terminal which receives the initialization gate signal, a first terminal connected to the third node, and a second terminal connected to a line of the bias voltage, and the anode terminal of the light-emitting element is connected to the second terminal of the third transistor, and the light-emitting element further includes a cathode terminal connected to a line of a second power supply voltage.

16. The electronic display device of claim 15, wherein, the emission driver further provides a second emission signal to the pixel circuit, and the pixel circuit further includes a fourth transistor which provides a first power supply voltage to the first terminal of the first transistor in response to the second emission signal.

17. The electronic device of claim 16, wherein, the gate driver further provides an initialization gate signal to the pixel circuit, and the pixel circuit further includes a fifth transistor which provides a bias voltage to the anode terminal of the light-emitting element in response to the initialization gate signal.

* * * * *